(12) United States Patent
Jochum

(10) Patent No.: US 7,419,195 B1
(45) Date of Patent: Sep. 2, 2008

(54) KNOT TYING TOOL

(76) Inventor: Wolfgang Jochum, 2645 Ridge St., Yorktown Heights, NY (US) 10598

( * ) Notice: Subject to any disclaimer, the term of this patent is extended or adjusted under 35 U.S.C. 154(b) by 0 days.

(21) Appl. No.: 12/002,700

(22) Filed: Dec. 18, 2007

(51) Int. Cl.
*D03J 3/00* (2006.01)
(52) U.S. Cl. ...................................... 289/17
(58) Field of Classification Search ............... 289/17; D22/149
See application file for complete search history.

(56) References Cited

U.S. PATENT DOCUMENTS

| | | | |
|---|---|---|---|
| 2,469,037 A | 5/1949 | Harvey | |
| 2,498,920 A | 2/1950 | Holland | |
| 2,734,299 A | 2/1956 | Masson | |
| 2,843,961 A | 7/1958 | Semple | |
| D211,685 S | 7/1968 | Hill | D22/31 |
| 3,498,656 A | 3/1970 | Vargo | |
| D219,021 S | 10/1970 | Graber | D22/31 |
| 3,700,272 A | 10/1972 | Bauer | 289/17 |
| 3,787,081 A | 1/1974 | Macy | 289/17 |
| 3,837,691 A | 9/1974 | Symthe | 289/17 |
| 4,029,346 A | 6/1977 | Browning | 289/17 |
| D247,713 S * | 4/1978 | Etes | D22/149 |
| 4,101,152 A | 7/1978 | Gardipee | 289/17 |
| 4,188,052 A | 2/1980 | Browning | 289/17 |
| 4,336,960 A | 6/1982 | Seki | 289/17 |
| 4,400,025 A | 8/1983 | Dennison | 289/17 |
| 4,403,797 A | 9/1983 | Ragland, Jr. | 289/17 |
| 4,417,756 A | 11/1983 | Herke | 289/2 |
| 4,573,719 A | 3/1986 | Aldridge | 289/17 |
| 4,607,869 A | 8/1986 | Bersche | 289/17 |
| 4,613,173 A | 9/1986 | Rosser | 289/17 |
| 4,871,200 A | 10/1989 | Ryder et al. | 289/17 |
| 5,009,025 A | 4/1991 | Austad | 43/44.83 |
| 5,082,318 A | 1/1992 | Held et al. | 294/19.1 |
| 5,197,217 A | 3/1993 | Browning | 43/4 |
| 5,217,470 A | 6/1993 | Weston | 606/148 |
| 5,240,295 A | 8/1993 | Spencer | 289/1.5 |
| 5,593,189 A | 1/1997 | Little | 289/17 |
| 5,685,037 A | 11/1997 | Fitzner et al. | 7/106 |
| 5,690,369 A | 11/1997 | Steck, III | 289/17 |

(Continued)

OTHER PUBLICATIONS

Bass Pro Shops Search Results; http://www.basspro.com/webapp/wcs/stores/servlet/SearchResults?storeId=10151&catalog; Dec. 5, 2007; 2 pages.

(Continued)

*Primary Examiner*—Shaun R Hurley
(74) *Attorney, Agent, or Firm*—Watov & Kipnes, P.C.; Kenneth Watov

(57) ABSTRACT

A knot tying tool for tying knots in cords or lines of material including those for attaching the line to an eyelet of an object, includes a base member having first and second ends, a first post extending from the first end of the base member, a second post extending from the second end of the base member, a loop retainer operatively associated with the second post for retaining a portion of one loop of a line forming part of a knot being tied, wherein the line includes a working end and a standing end, a support member operatively associated with the first post, wherein the support member includes a catch positioned spaced apart from the loop retainer for holding a portion of the retained loop of the line, and a rotatably-actuated clamp assembly for receiving and releasably retaining the standing end of the line.

17 Claims, 15 Drawing Sheets

U.S. PATENT DOCUMENTS

| | | | |
|---|---|---|---|
| 5,690,370 A | 11/1997 | Steck, III | 289/17 |
| 5,829,798 A | 11/1998 | Little | 289/17 |
| 6,171,317 B1 | 1/2001 | Jackson et al. | 606/148 |
| 6,322,112 B1 | 11/2001 | Duncan | 289/1.5 |
| 6,409,230 B1 | 6/2002 | Entenmann | 289/18.1 |
| 6,681,514 B1 | 1/2004 | Jursik | 43/4 |
| 6,702,339 B1 | 3/2004 | Geozalian | 289/17 |
| 6,715,804 B2 | 4/2004 | Beers | 289/17 |
| 6,779,817 B2 | 8/2004 | Ota | 289/17 |
| 6,817,634 B2 | 11/2004 | Champion | 289/17 |
| 6,902,212 B1 | 6/2005 | Mize | 289/17 |
| 6,938,934 B2 | 9/2005 | Khaitan | 289/17 |
| 2002/0139031 A1 | 10/2002 | Ragucci | 43/1 |

OTHER PUBLICATIONS

Endoscopic Devices & Laparoscopic Suturing Systems, Suture Knot Typing Device, Pre-Tied Locking Roeder Knot; http://paresurgical.com/knot/index.htm; Jul. 24, 2007; 1 page.

* cited by examiner

KNOT TYING TOOL

FIELD OF THE INVENTION

The present invention relates to knot tying tools, and more particularly, to a knot tying tool for tying of a breakproof knot to attach a line to an object having an eyelet.

BACKGROUND OF THE INVENTION

For centuries, knots provide useful means for fastening or securing linear material such as strings, webbings, twines, straps, threads, lines, or ropes through specific combinations of tying or interweaving. The knot may include one or more segments that are interwoven to bind to itself or to some other object (or the load). Knots are used in various domestic, recreational, occupational and industrial settings. One particular area where the knot has been an essential implement is fishing. Fishing lines and fish hooks have been used for centuries by fishermen to catch fresh and saltwater fish. Fish hooks are typically attached to a line or lure device through some form of a knot, which ultimately connects the fish caught to the fisherman.

Modern fishing lines intended for spinning, spin cast, or bait casting reels are almost entirely made from artificial substances, including nylon, polyethylene, Dacron and the like. The most common type is monofilament, which is in the form of a single-stranded line. Other alternatives to standard nylon monofilament lines are those made of copolymers or fluorocarbon, or a combination of the two materials.

Such fishing lines typically exhibit a small diameter, minimal stretch, and good strength with relatively smooth exteriors, which may cause the lines to be difficult to handle and to require complex knots to ensure the maximum strength of the line at the knot and to prevent the knot from slipping or coming loose during use. In attaching lines to objects such as hooks, swivels, lures, sinkers and the like, it has been a common practice for fishermen to use their hands to hold the object to which the line is to be tied while manipulating the line to form these complex knots. Frequently fishermen face considerable difficulties in correctly tying these complex knots and in some instances, the fishermen has been injured by the sharp hooks during the knot tying process.

Therefore, there is a need to develop a knot tying tool suitable for tying of a knot to attach a line to an object having an eyelet in a manner that requires minimal handling of the object, and is suitable for those with limited dexterity. There is a further need to develop a knot tying tool designed as a compact, hand-holdable device capable of tying a knot that is breakproof, and minimizes weaking of the line at the knot. There is a further need to develop a knot tying tool that provides a safe, simple, easy to use device for assisting a user especially in tying knots in a fish line and/or tying a fish line to hooks.

SUMMARY OF THE INVENTION

The present invention relates generally to a knot tying tool for tying knots in cords or lines of material including those for attaching the line to an eyelet of an object. The knot tying tool of the present invention is designed to provide a compact, hand-holdable device that is simple and convenient to use, and easy to carry and store. The knot tying tool of the present invention is adapted to enable a user to tie a knot that is breakproof. The knot tying tool is further adapted to form knots in a manner that greatly minimizes adverse weakening of the line at the knot, and limits the slipping or loosening of the knot during use. The knot tying tool of the present invention is further designed to facilitate the ease of knot tying, especially for those with limited dexterity including, for example, children and elderly users. In particular, the knot tying tool of the present invention is especially useful for operation by fishermen under various adverse conditions including wet and cold conditions. The knot tying tool of the present invention is further simple and inexpensive to fabricate and implement.

In one aspect of the present invention, there is provided a knot tying tool for tying knots in cords or lines of material including those for attaching the line to an eyelet of an object, the knot tying tool comprising:

a base member having first and second ends;

a first post extending from the first end of the base member;

a second post extending from the second end of the base member;

loop retaining means operatively associated with the second post for retaining at least a portion of one loop of a line forming part of a knot being tied, wherein the line includes a working end and a standing end; and a support member operatively associated with the first post, said support member including a catch positioned spaced apart from the loop retaining means for holding a portion of the retained at least one loop of the line.

In a further aspect of the present invention, there is provided a knot tying tool for tying knots in cords or lines of material including those for attaching the line to an eyelet of an object, the knot tying tool comprising:

a base member having first and second ends;

a first post extending from the first end of the base member;

a second post extending from the second end of the base member;

loop retaining means operatively associated with the second post for retaining at least one loop of a line forming part of a knot being tied, wherein the line includes a working end and a standing end;

a support member operatively associated with the first post, said support member including a catch positioned spaced apart from the loop retaining means for holding a portion of the retained at least one loop of the line; and a rotatably actuated clamp assembly located at the first end of the base member, said rotatably-actuated clamp assembly being adapted for receiving and releasably retaining the standing end of the line.

In a further aspect of the present invention, there is provided a knot tying tool for tying knots in cords or lines of material including those for attaching the line to an eyelet of an object, the knot tying tool comprising:

a base member having first and second ends;

a first post extending from the first end of the base member;

a second post extending from the second end of the base member;

at least one notch extending along at least a portion of the periphery of the second post, and configured for receiving a first portion of at least one loop of a line forming part of a knot being tied, wherein the line includes a working end and a standing end;

a guide rod including proximal and distal ends, said guide rod being adapted for slidable operation through the first post between an extended position and a retracted position relative to the second post;

said guide rod comprising a projection extending radially from the distal end thereof and positioned spaced apart from the loop retaining means for holding a second portion of at least one loop in cooperation with the loop retaining means, and a slot at the proximal end thereof for receiving and retaining a portion of the line therein, and an alignment pin located near the proximal end thereof;

said first post comprising a corresponding recess for receiving the alignment pin of the guide rod to prevent rotation of the guide rod when the guide rod is in the extended position;

a rotatably-actuated clamp assembly located proximate the first end of the base member, comprising a rotatable eccentric stud, and a pin operatively associated with the eccentric stud for receiving and releasably retaining the standing end of the line therebetween; and at least one groove extending longitudinally along the distal end of the second post proximate the at least one notch, said at least one groove being adapted for facilitating the passing of the working end of the line through the inside portion of the retained at least one loop.

In another aspect of the present invention, there is provided a method for tying knots in cords or lines of material including those for attaching the line to an eyelet of an object, comprising the steps of:

a) forming a knot tying tool comprising:
a base member having first and second ends;
a first post extending from the first end of the base member;
a second post extending from the second end of the base member;
loop retaining means operatively associated with the second post for retaining at least a portion of one loop of a line forming part of a knot being tied, wherein the line includes a working end and a standing end;
a support member operatively associated with the first post, said support member including a catch positioned spaced apart from the loop retaining means for holding a portion of the retained at least one loop of the line;
a rotatably-actuated clamp assembly located proximate to the first end of the base member, being adapted for receiving and releasably retaining the standing end of the line; and
at least one groove extending longitudinally along the distal end of the second post proximate the at least one notch, said at least one groove being adapted for facilitating the passing of the working end of the line through the inside portion of the retained at least one loop;

b) obtaining a predetermined length of a line having a working end and a standing end;

c) securing a portion of the standing end of the line in the rotatably-actuated clamp assembly;

d) passing the working end of the line through an eyelet of an object to be attached;

e) looping at least one loop from a portion of the working end of the line around the loop retaining means and the catch of the support member to form a looped segment;

f) directing additional portions of the working end of the line around the loop retaining means and the catch of the supporting member, into one of the at least one groove through the inside portion of the retained looped segment, through the portion of the at least one loop between the catch and the loop retaining means, or combinations thereof;

g) removing said looped segment along with said object from the loop retaining means and the catch of the supporting member; and h) pulling the working end and standing end to tighten the looped segment into the resulting knot.

BRIEF DESCRIPTION OF THE DRAWINGS

The following drawings are illustrative of embodiments of the present invention and are not intended to limit the invention as encompassed by the claims forming part of the application, wherein like items are identified by the same reference designations:

DETAILED DESCRIPTION OF THE INVENTION

The present invention is directed generally to a knot tying tool for tying knots in cords or lines of material including those for attaching the line to an eyelet of an object. The knot tying tool of the present invention is designed to provide a compact, hand-holdable device that is simple and convenient to use, and easy to carry and store. The knot tying tool of the present invention is adapted to enable a user to tie a knot that is breakproof. The knot tying tool is further adapted to form knots in a manner that greatly minimizes adverse weakening of the line at the knot, and limits the slipping or loosening of the knot during use. The knot tying tool of the present invention is further designed to facilitate the ease of knot tying, especially for those with limited dexterity including, for example, children and elderly users. In particular, the knot tying tool of the present invention is especially useful for operation by fishermen under various adverse conditions including wet and cold conditions. The knot tying tool of the present invention is further simple and inexpensive to fabricate and implement.

Figure 1A:
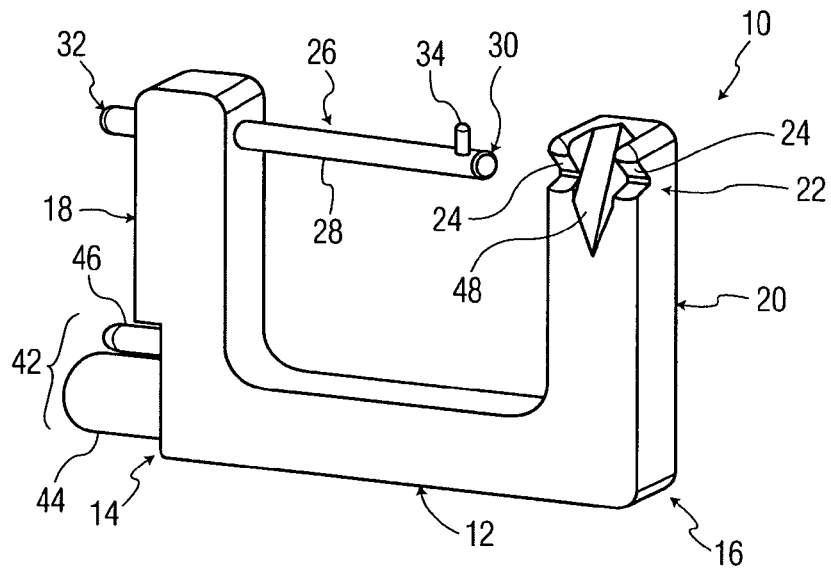
FIG. 1A is a perspective front view of a knot tying tool with a guide rod in an extended position for one embodiment of the present invention.
Figure 1B:
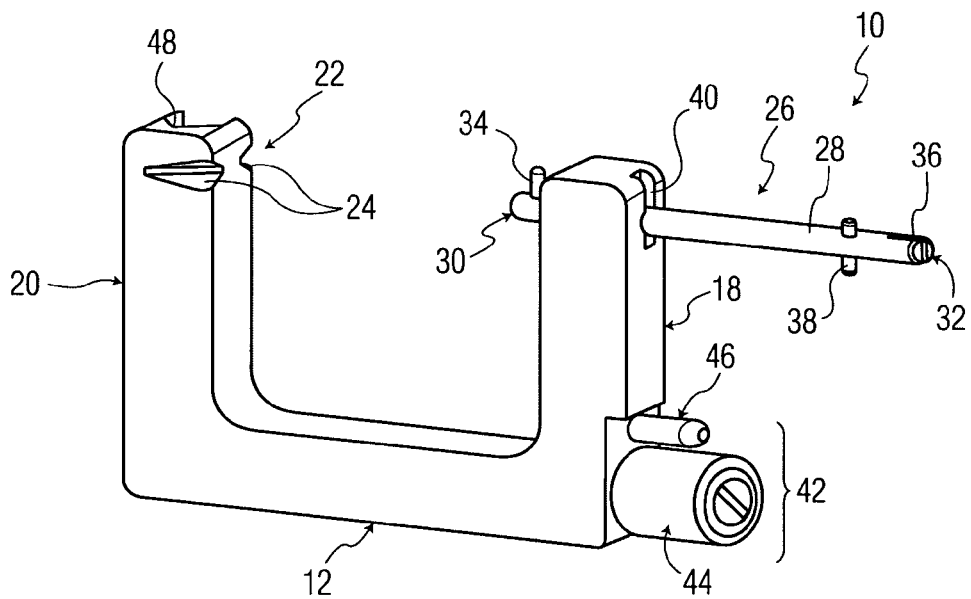
FIG. 1B is a perspective rear view of the knot tying tool with the guide rod in a retracted position in accordance with the present invention.

Referring to FIGS. 1A and 1B, a knot tying tool 10 designed for facilitating tying of a knot including a breakproof knot to attach a line to an eyelet of an object is shown for one embodiment the present invention. It will be understood that the present invention can be implemented for tying any form or style of a knot especially those useful for attaching a line to an eyelet of an object. Although the following description refers largely to the tying of hooks or lures to fishing lines, no such limitation is intended, and any adaptation of the invention whereby a knot may be formed in a length of linear material including a line, a cord, a rope, a cable, a thread, a fiber, a string, a webbing, a twine, a strap or the like for the purpose of tying an item thereto, especially when that item has an eyelet through which the line or rope is fed to form the knot is meant to be included.

The line generally includes a working end, which is the active end of the line used in making the knot, a standing end, which is the end of the line not involved in making the knot, a working part, which is the section of the line between the knot and the working end, and a standing part, which is the section of line between the knot and the standing end.

As shown in FIGS. 1A and 1B, the knot tying tool 10 comprises a base member 12 having a first end 14 and a second end 16, a first post 18 extending vertically from the first end 14 of the base member 12, and a second post 20 extending vertically from the second end 16 of the base member 12. The knot tying tool 10 further comprises a loop retaining portion 22 located on the distal end of the second post 20. The loop retaining portion 22 is adapted for retaining one or more loops of a line forming part of the knot.

Figure 5:
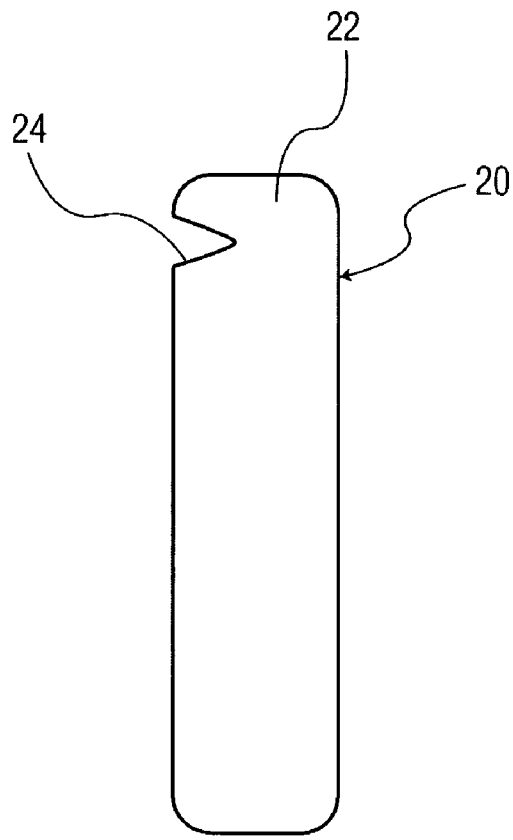
FIG. 5 is an elevational view of the knot tying tool of FIG. 1A looking toward a second end or right side thereof in accordance with the present invention.

The loop retaining portion 22 includes one or more notches 24 extending along at least a portion of the periphery of the second post 20, and configured for retaining the one or more loops of the line therearound. The notches 24 hold the loop of line in place during the formation of the knot, and function to prevent the loop of line from slipping as will be further described hereinafter. The loop retaining portion 22 further includes a groove or channel 48 extending longitudinally along the distal end of the second post 20. The groove 48 is adapted for facilitating the passing of the working end of the line through the inside portion of the retained one or more loops secured on the loop retaining portion 22. Note also that a right side elevational view of the knot tying tool 10 provided by the second post 20 is shown in FIG. 5.

The knot tying tool 10 further comprises a support member 26 extending from the distal end of the first post 18 toward the loop retaining portion 22 of the second post 20. The support member 26 is adapted for clutching onto a portion of the one or more loops of the line retained by the loop retaining portion 22 in a spaced apart manner. The support member 26 comprises a guide rod 28 having a distal end 30 and a proximal end 32 extending through the first post 18, and is adapted to slide between an extended position (as shown best in FIG. 1A) and a retracted position (as shown best in FIG. 1B). The loop retaining portion 22 of the second post 20 and the support member 26 in combination provides a work area or area for supporting the one or more loops of line to form the knot.

The guide rod 28 further includes a catch 34 in the form of a projection or short stud extending radially from the distal end 30 thereof, and is positioned to hold onto a portion of the at least one loop of the line at spaced apart distance from the loop retaining portion 22 of the second post 20. The catch 34 of the guide rod 28 expands the space in the retained loop of the line, thus enhancing the handling and manageability of the retained loop during forming of the knot. The guide rod 28 further comprises a slot 36 as shown in FIG. 1B at the proximal end 32 thereof for receiving and retaining a standing part of the line therein. During operation, the slot 36 is oriented vertically as will be further described hereinafter, along with details of tying a preferred knot.

As shown in FIG. 1B, the guide rod 28 comprises an alignment pin 38 located near the proximal end 32 thereof, and extending transversely therethrough. The exterior face of the first post 18 includes a corresponding recess 40 for receiving the alignment pin 38 of the guide rod 28. When the guide rod 28 is in the extended position shown in FIG. 1A, the alignment pin 38 is adapted to be seated within the recess 40 (see also FIG. 2) to properly orient the catch 34 in an upright position relative to the loop retaining portion 22 of the second post 20, and to prevent rotation of the guide rod 28 during the forming of the knot.

The knot tying tool 10 comprises a rotatably-actuated clamp assembly 42 located proximate the first end 14 of the base member 12, which is adapted for receiving and retaining a portion of the standing end of the line. The rotatably-actuated clamp assembly 42 includes a rotatable eccentric stud 44 and a fixed pin 46 operatively associated with the eccentric stud 44. The standing end of the line is secured between the stud 44 and the pin 46 as will be described hereinafter.

Figure 2:
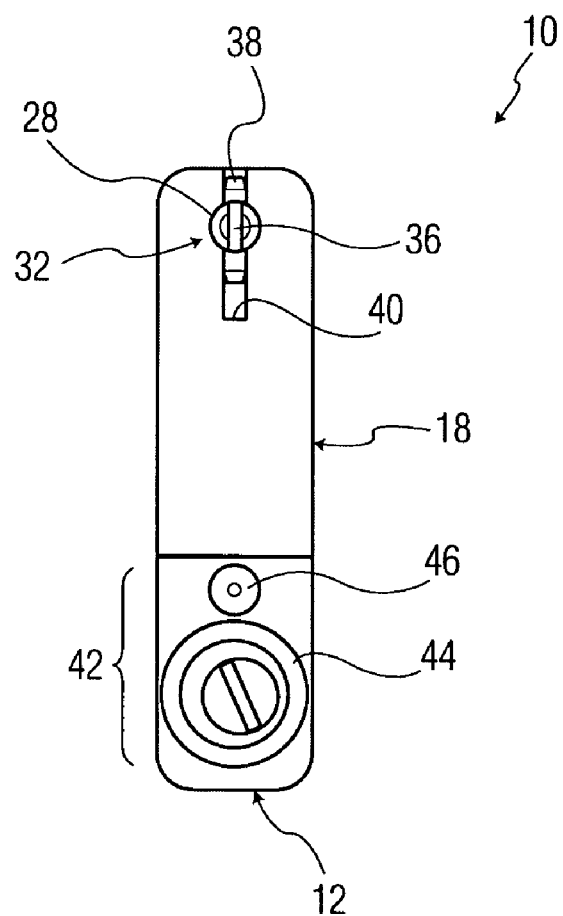
FIG. 2 is an elevational view of the knot tying tool of FIG. 1A looking toward a first end or left side thereof in accordance with the present invention.

Referring to FIG. 2, the guide rod 28 and the rotatably-actuated clamp assembly 42 are arranged to substantially minimize excessive bending or stretching of the line during formation of the knot, and to securely retain a portion of the standing part of the line. The eccentric stud 44 is configured for rotation and operates with the fixed pin 46 to expediently secure or release the standing end of the line. The guide rod 28 is located at a position relative to the eccentric stud 44 and the fixed pin 46 to receive the standing part of the line extending from the rotatably-actuated clamp assembly 42.

As shown in the left side or first end view of FIG. 2, the guide rod 28 is slidably moved to the extended position with the alignment pin 38 securely seated within the recess 40 of the first post 18 during the formation of the knot. The slot 36 on the proximal end 32 of the guide rod is oriented vertically in alignment with the standing part of the line extending from the rotatably-actuated clamp assembly 42. The standing part of the line is fed into the slot 36 of the guide rod 28 and retained therein through frictional contact. The remaining work part of the line is set on the loop retaining portion 22 of the second post 20 and the catch 34 of the guide rod 28 to initiate the tying of the knot as will be described hereinafter.

Figure 3:
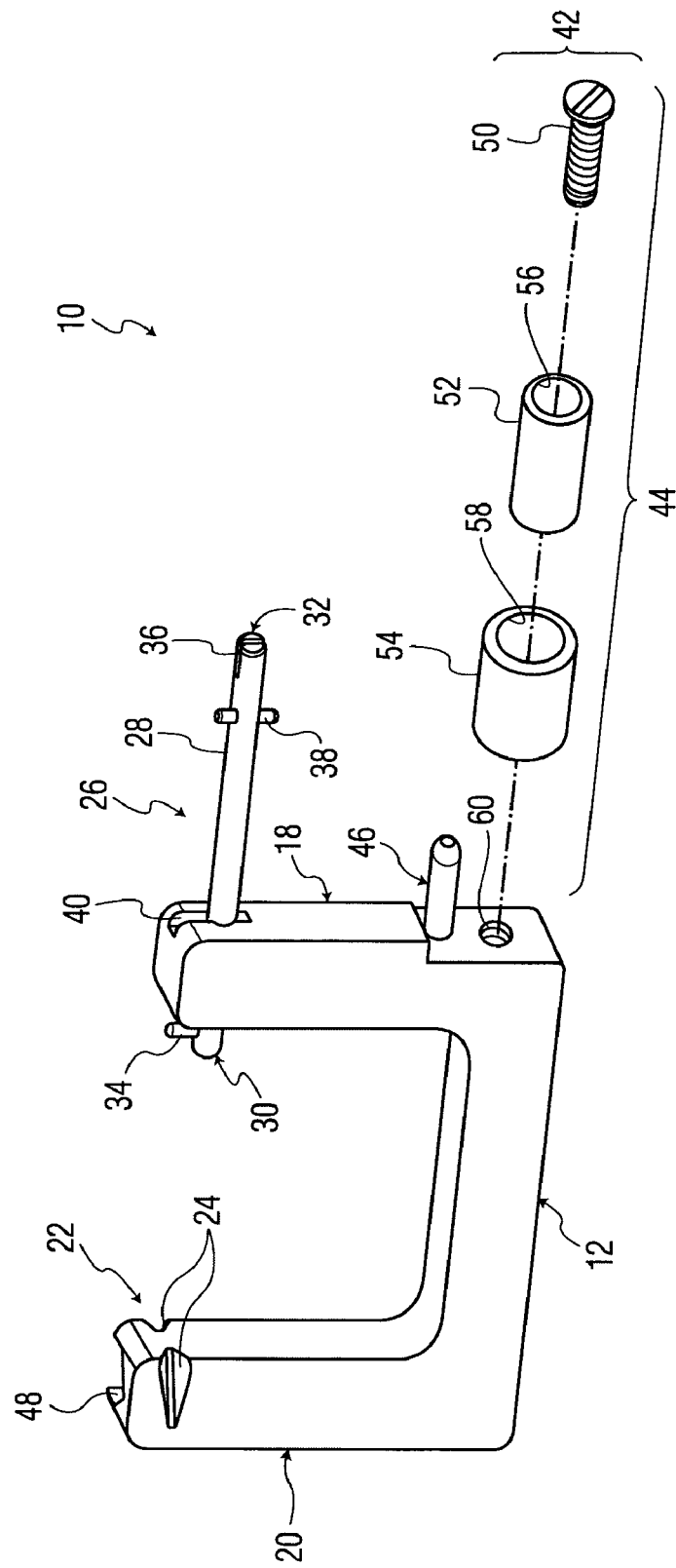
FIG. 3 is an exploded assembly view of eccentric clamp components of the knot tying tool in accordance with the present invention.

Referring to FIG. 3, the guide rod 28 is slidably moved to the retracted position whereby the alignment pin 38 is withdrawn from the recess 40. This allows the user to guide rod 28 to move the catch 34 away from the work area as the looped segment of the line forming part of the knot is prepared for removal from the loop retaining portion 22 of the second post 20. The clamp mechanism of the rotatably-actuated clamp assembly 42 is further shown in greater detail. The rotatable eccentric stud 44 includes a resilient cylindrical outer covering 54, an eccentric tubular member 52 retaining the covering 54 thereon, and a central screw 50 for fastening the tubular member 52 to the base member 12.

The eccentric tubular member 52 and the resilient outer covering 54 are rotatably mounted on the first end 14 of the base member 12 via the captive screw 50. The screw 50 is inserted into an inside portion 56 of the tubular member 52. The tubular member 52 is inserted into an inside portion 58 of the resilient covering 54 with the end of the screw 50 protruding therefrom being threadedly coupled to a corresponding threaded hole 60 in the base member 12. The cross section of the tubular member 52 is eccentrically shaped with its center offset from the screw 50 to yield a projecting part 62. The projecting part 62 of the eccentric tubular member 52 produces a smooth reciprocating motion relative to the fixed pin 46.

Figure 4A:
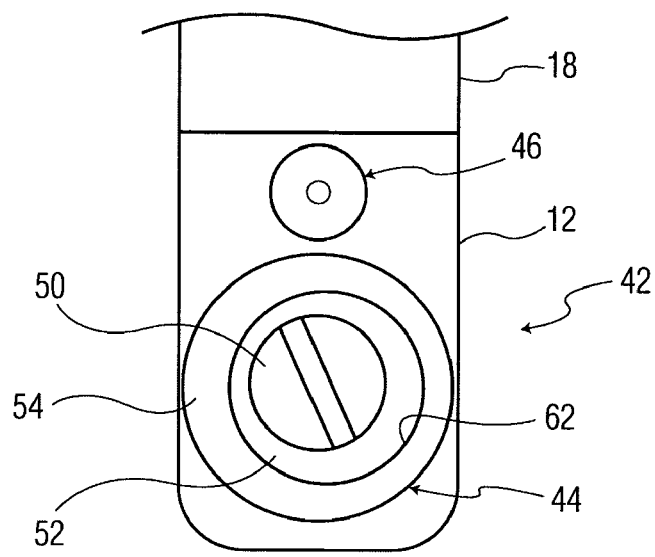
FIG. 4A is an exploded detailed view of an eccentric clamp assembly in the unsecured state in accordance with the present invention.
Figure 4B:
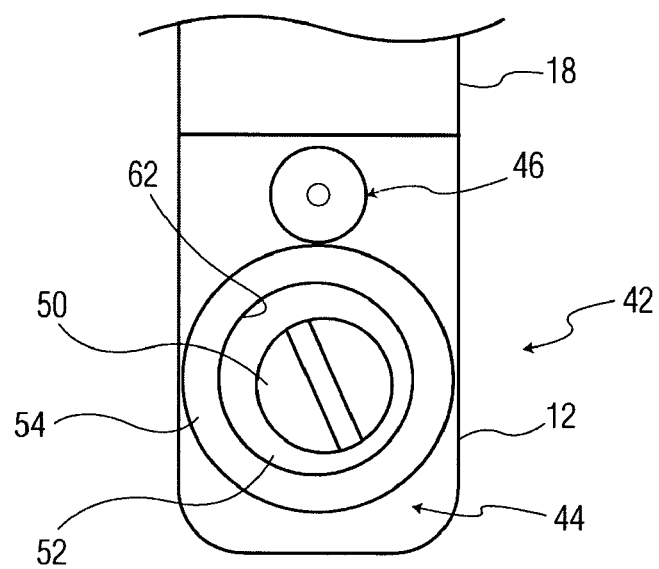
FIG. 4B is an exploded detailed view of the eccentric clamp assembly in the secured state in accordance with the present invention.

Referring to FIGS. 4A and 4B, the projecting part 62 is configured to strike the fixed pin 46 through the resilient outer covering 54 at a certain point of the rotation about the central screw 50 in a cam-like manner. The resilient outer covering 54 is selected to enhance safe grasping of the line, while substantially minimizing excessive nicking, bending or stretching in the line, and is composed of a resilient material such as, for example, rubber or soft plastic tubing. As shown in FIG. 4A the projecting part 62 of the eccentric tubular member 52 is moved away from the fixed pin 46 to yield an open or unsecured state providing a space therebetween. In the unsecured state, the standing end of the line can be introduced or removed from the clamp assembly 42. As shown in FIG. 4B, the projecting part 62 of the eccentric tubular member 52 is moved toward the fixed pin 46 to an extent, causing the resilient outer covering 54 to contact with or press against the fixed pin 46 to yield a closed or secured state. In the secured state, the standing end of the line can be securely retained in the clamp assembly 42.

The present invention is further directed to a method for tying knots in cords or lines of material including those for attaching the line to an eyelet of an object. It will be understood that the present invention can be implemented for tying any form or style of a knot especially those useful for attaching a line to an object having an eyelet. After much experimentation, the Inventor has determined that the following illustrated method for tying a knot through the use of the knot tying tool 10 produces a preferred knot that exhibits a breakage strength that is greater than the breakage strength of the line from which the knot is formed.

Figure 6:
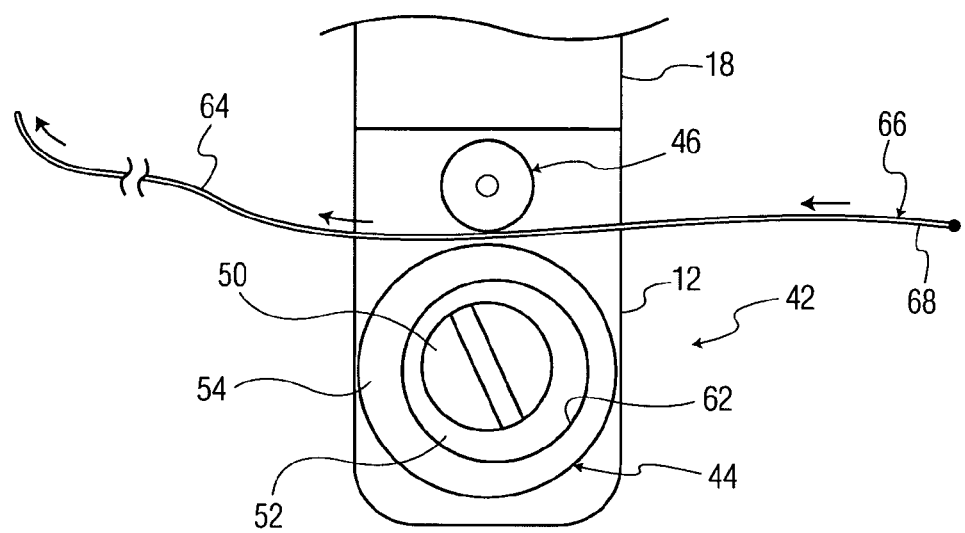
FIGS. 6 to 16 comprise illustrations showing the steps of a method for tying knots in cords or lines of material including those for attaching the line to an eyelet of an object for another embodiment of the present invention.
Figure 7:
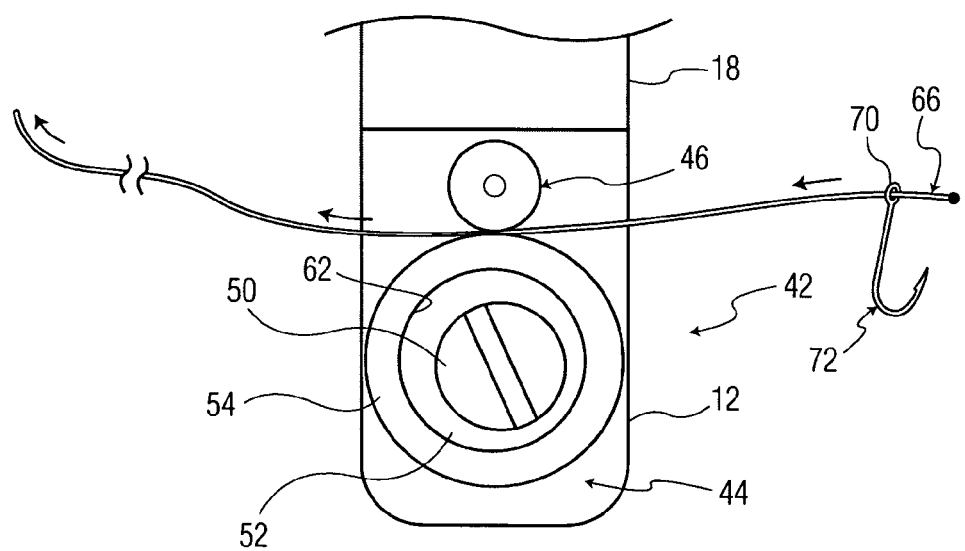

Referring to FIGS. 6 to 16, the method for tying a preferred knot in a cord or a line of material, including those for attaching the line to an eyelet of an object, is shown for one embodiment of the present invention. The user acquires the knot tying tool 10 of the present invention, and obtains a predetermined length of a line 66 having a working end 68 and a standing end 64, preferably about 18 inches of line. As shown in FIGS. 6 and 7, the standing end 64 of the line 66 is secured to the rotatably-actuated clamp assembly 42 by placement between the pin 46 and the stud 44. The stud 44 is rotated to move the projecting part 62 of the stud 44 to securely bias the line 66 against the pin 46 as shown best in FIG. 7. The working end 68 of the secured line 66 is pre-inserted into an eyelet 70 of a fish hook 72 to be attached to the line 66. As shown in FIG. 7, the working end 68 of the line 66 is passed through an eyelet 70 of a fish hook 72.

Figure 8:
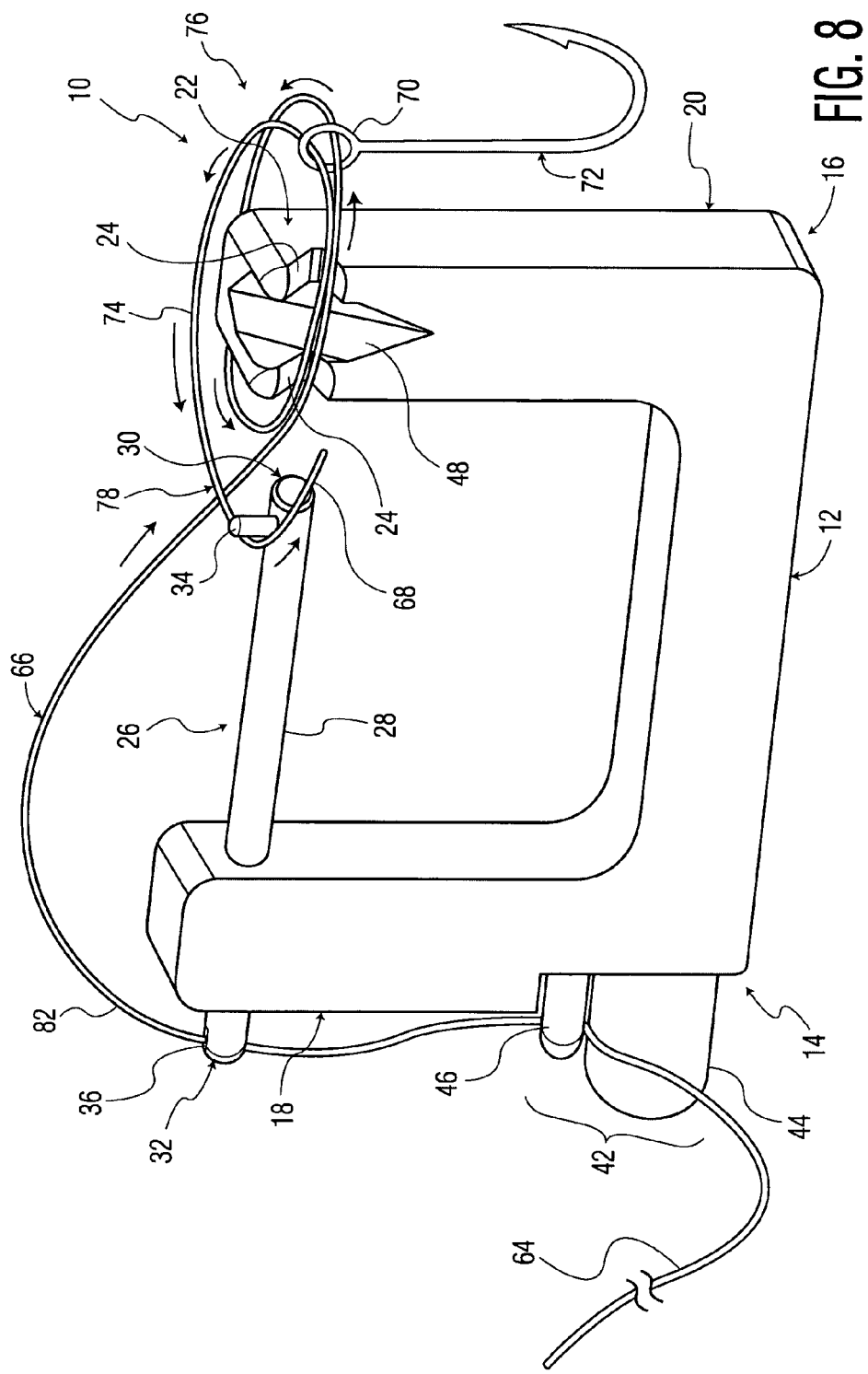
Figure 9:
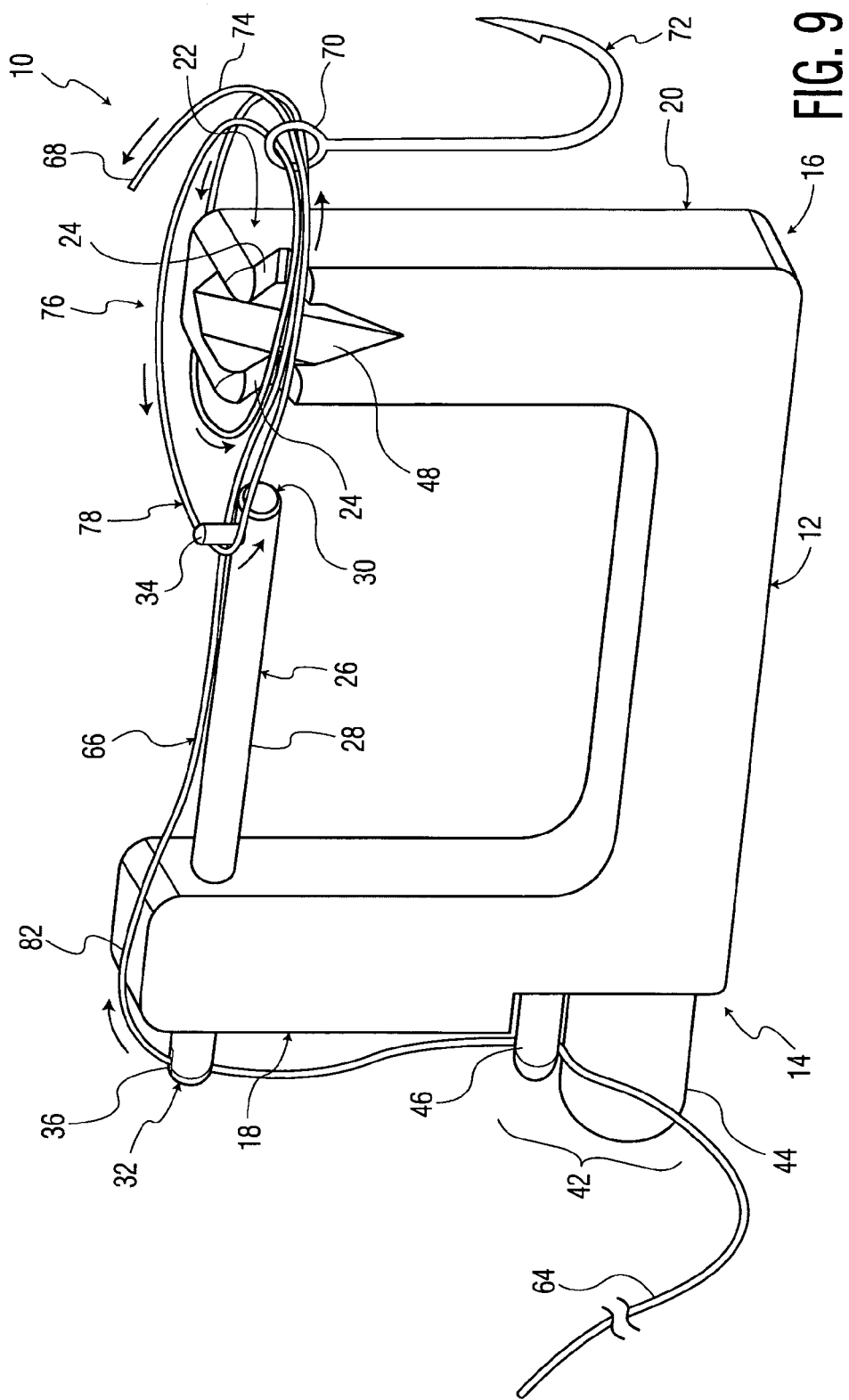

Referring to FIGS. 8 and 9, the standing part 82 of the line 66 between the fish hook 72 and the clamp assembly 42 is inserted and retained in the slot 36 of the extended guide rod 28 (see FIG. 2). The working part of 74 of the line 66 is looped around the loop retaining portion 22 of the second post 20 at least once, and retained in place by the notches 24 with the fish hook 72 resting against the second post 20 to form a looped segment 76. With each loop, the working end 68 of the line 66 is inserted through the eyelet 70 of the fish hook 72. The line 66 and the looped segment 76 are shown in a loosened state for illustration purposes. The working part 74 is looped at least once around the loop retaining portion 22 and the catch 34 of the guide rod 28 to form a triangular looped portion 78. The working end 68 of the line 66 is inserted through the eyelet 70 of the fish hook 72. As shown in FIG. 9, the line 66 is passed three times through the eyelet 70, in this example.

Figure 10:
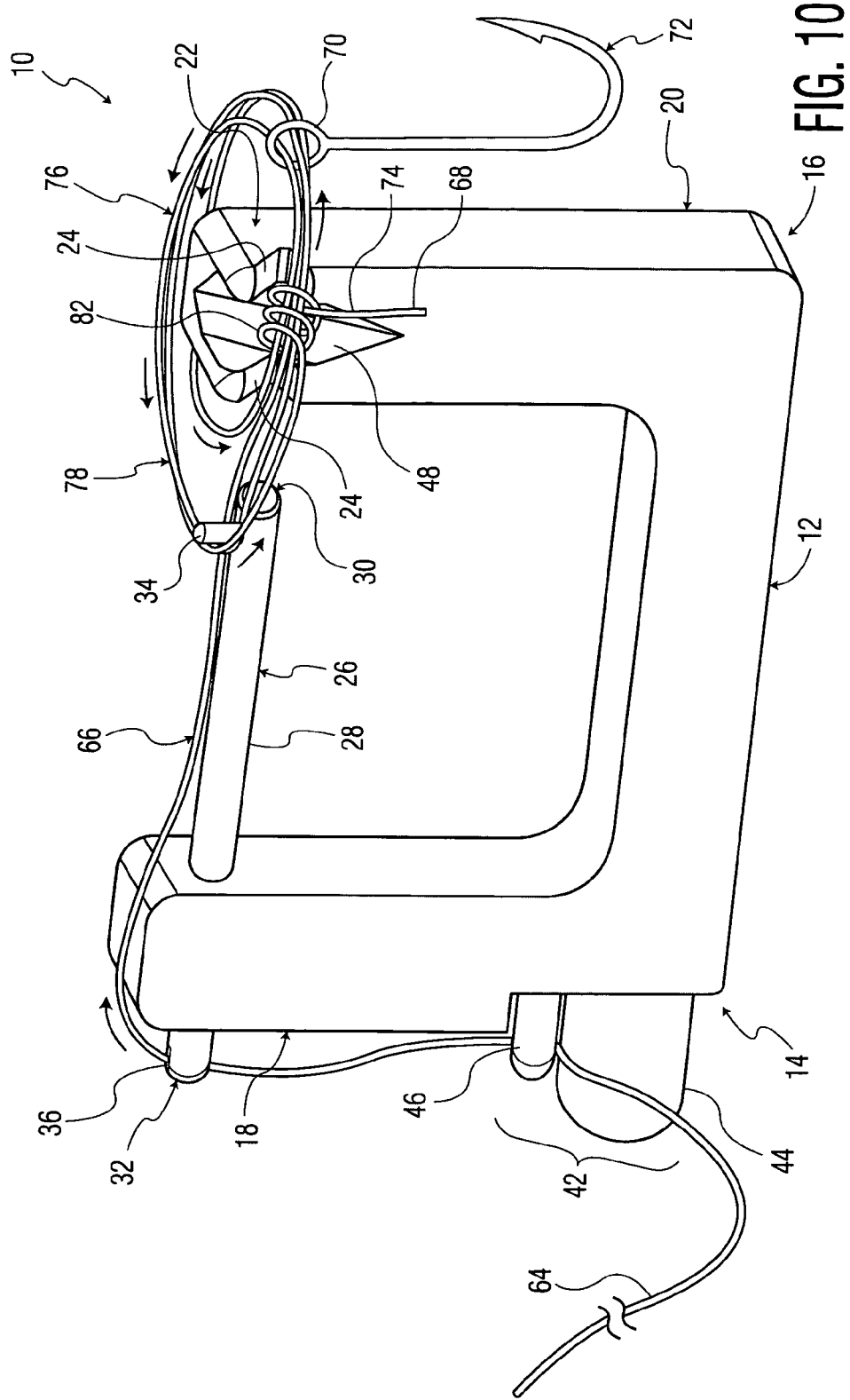
Figure 11:
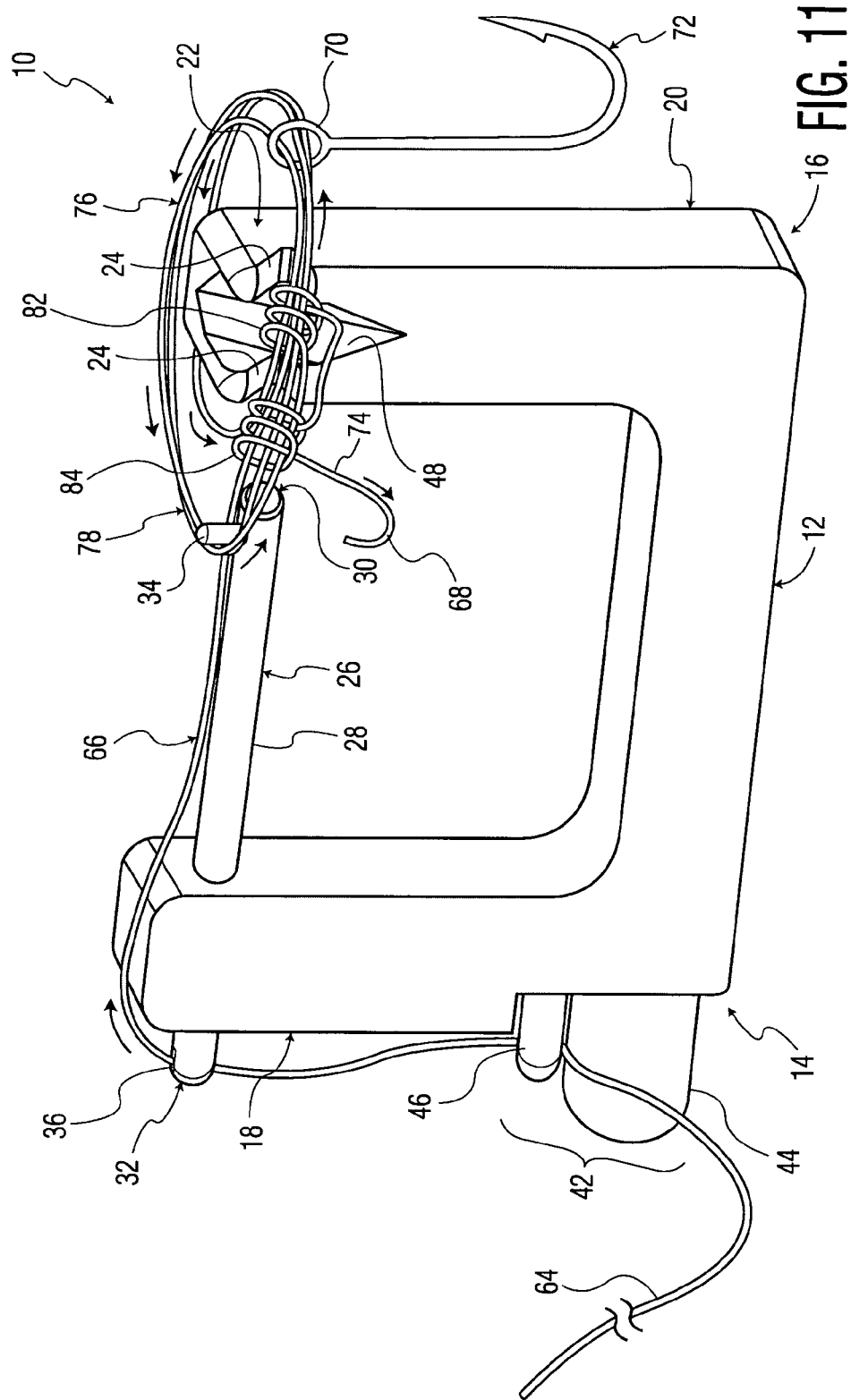
Figure 12:
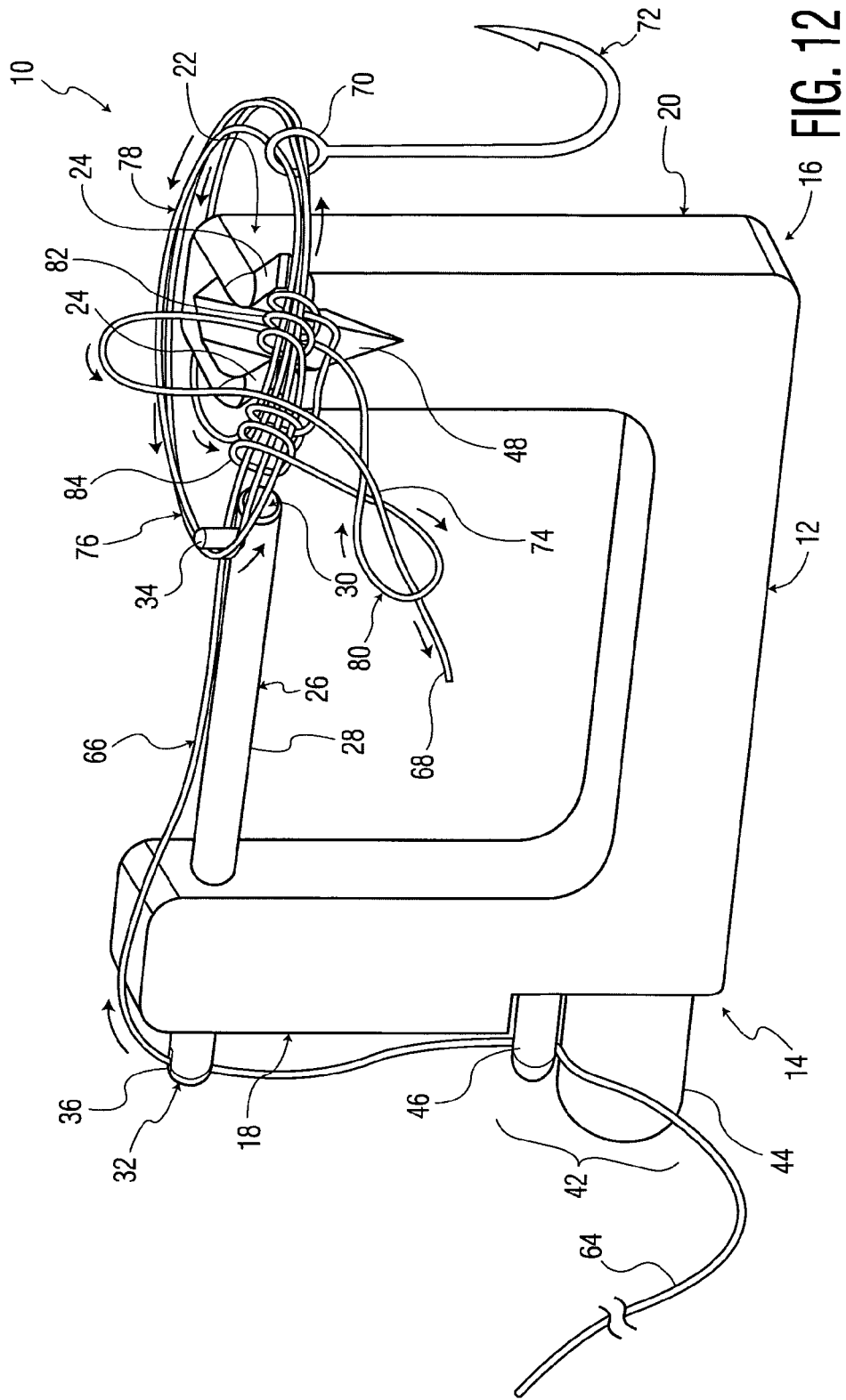
Figure 13:
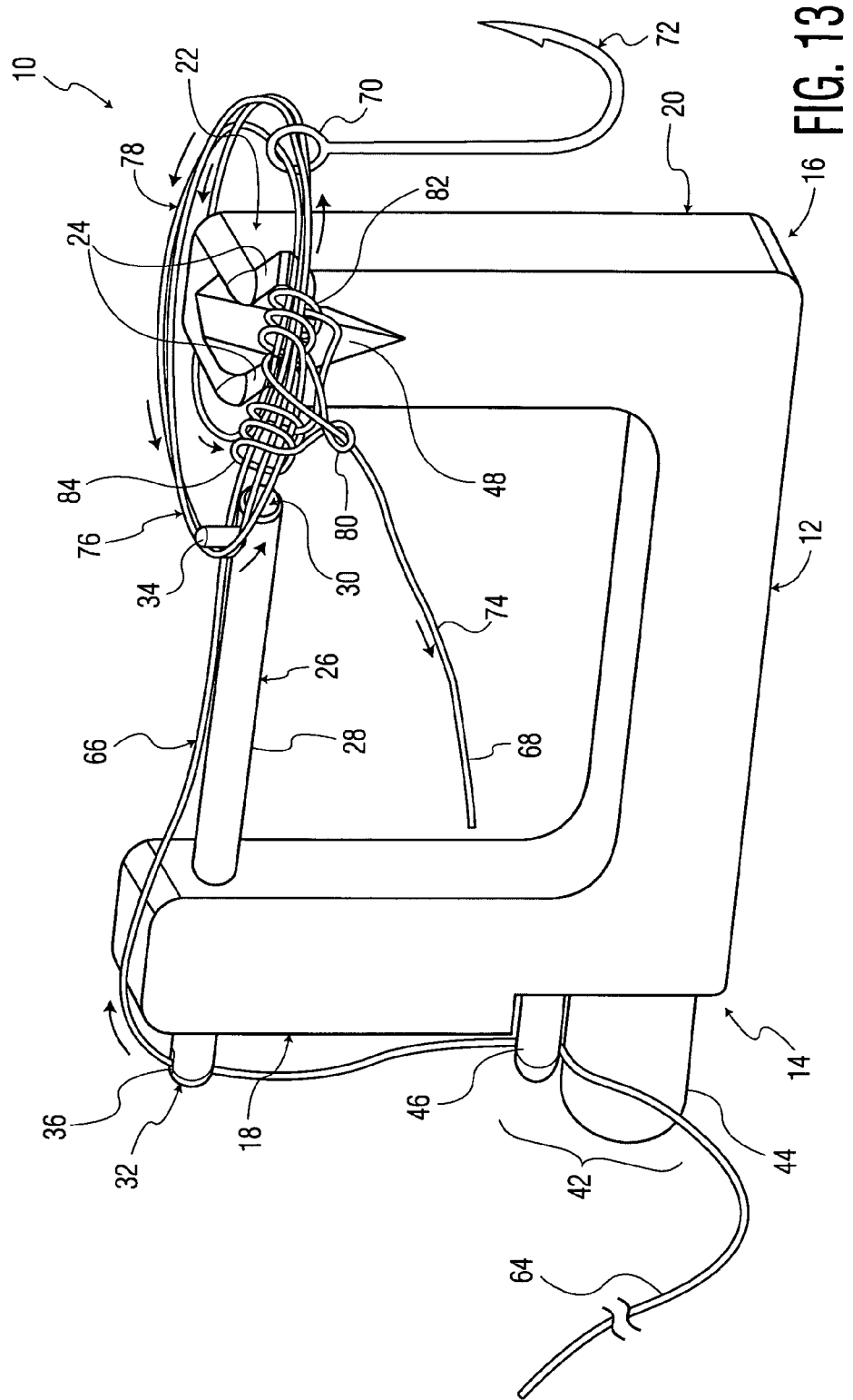

Referring to FIGS. 10 and 11, the working end 68 of the line 66 is inserted upward through the groove 48, and around the looped segment 76 to yield a turn 82. This step is repeated to produce at least 3 turns 82 around the three lines 66. As shown in FIG. 11, the working end 68 of the line 66 is then inserted upward through the triangular looped portion 78, and around the three lines 66 of the looped portion 78 to yield a turn 84. This step is repeated to produce at least 3 turns 84. Referring to FIG. 12, the working part 74 of the line 66 is then formed into a free loop 80, after producing the final turn 84. The working end 68 of the line 66 is then inserted upward through the groove 48 and then through the free loop 80. Referring to FIG. 13, the working end 68 of the line 66 is then pulled to tighten the free loop 80.

Figure 14:
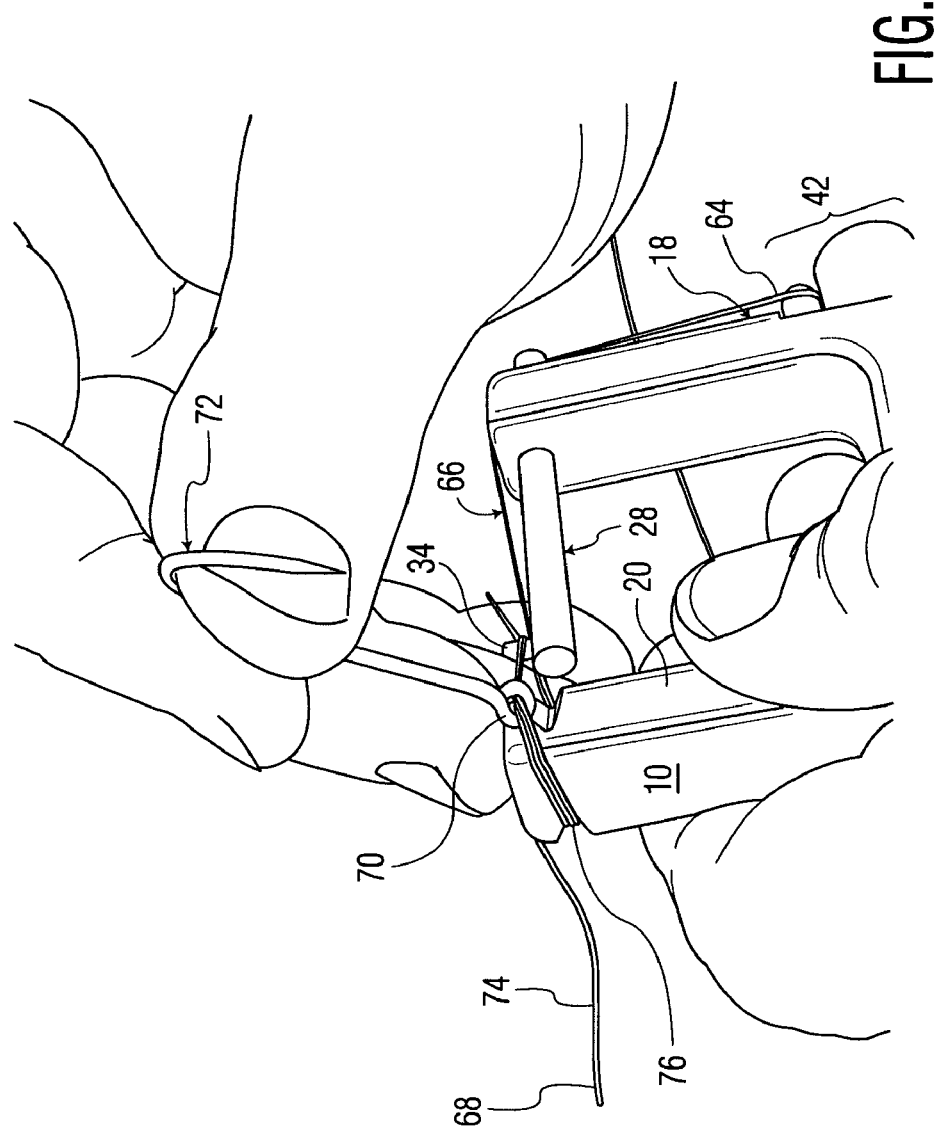
Figure 15:
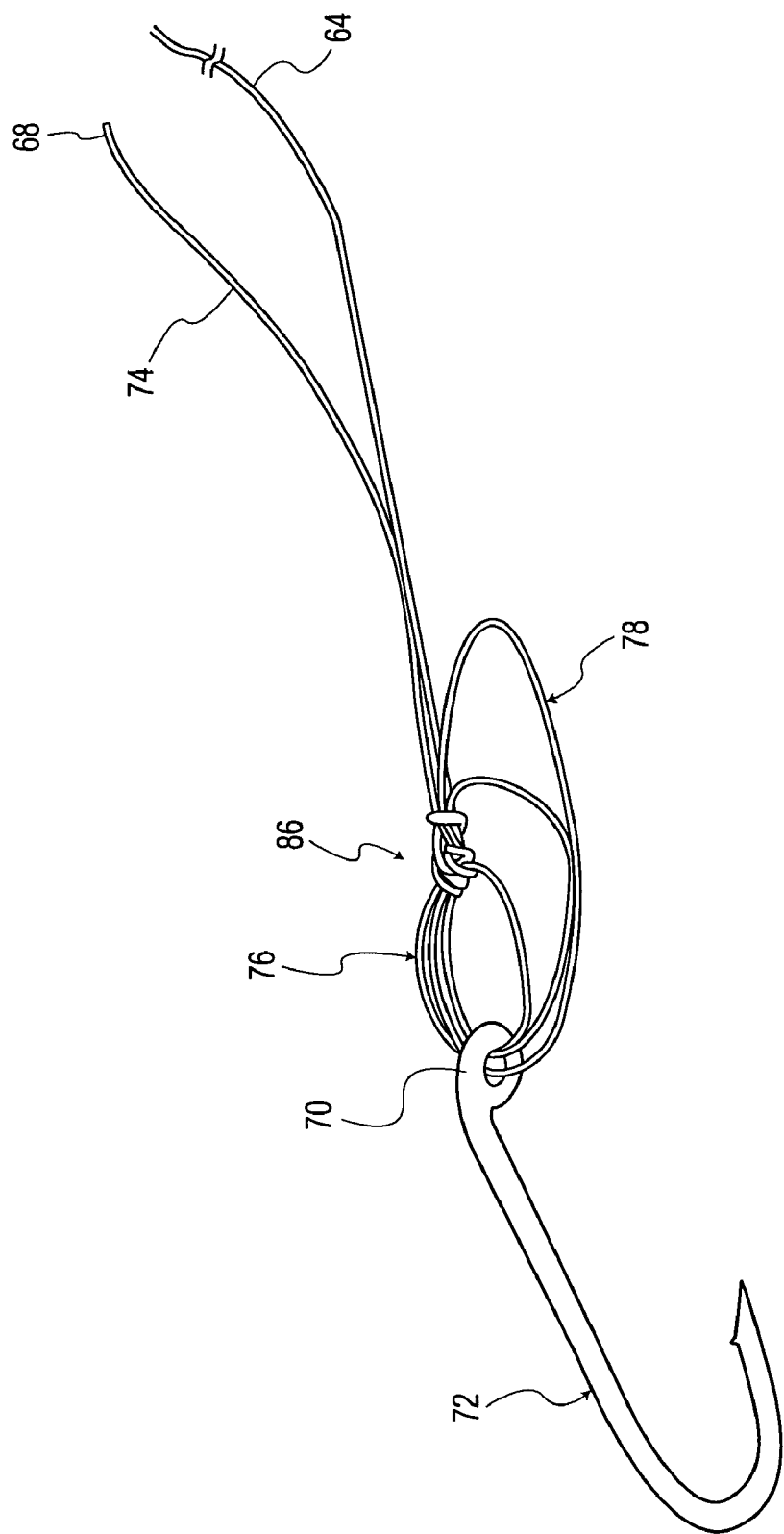
Figure 16:
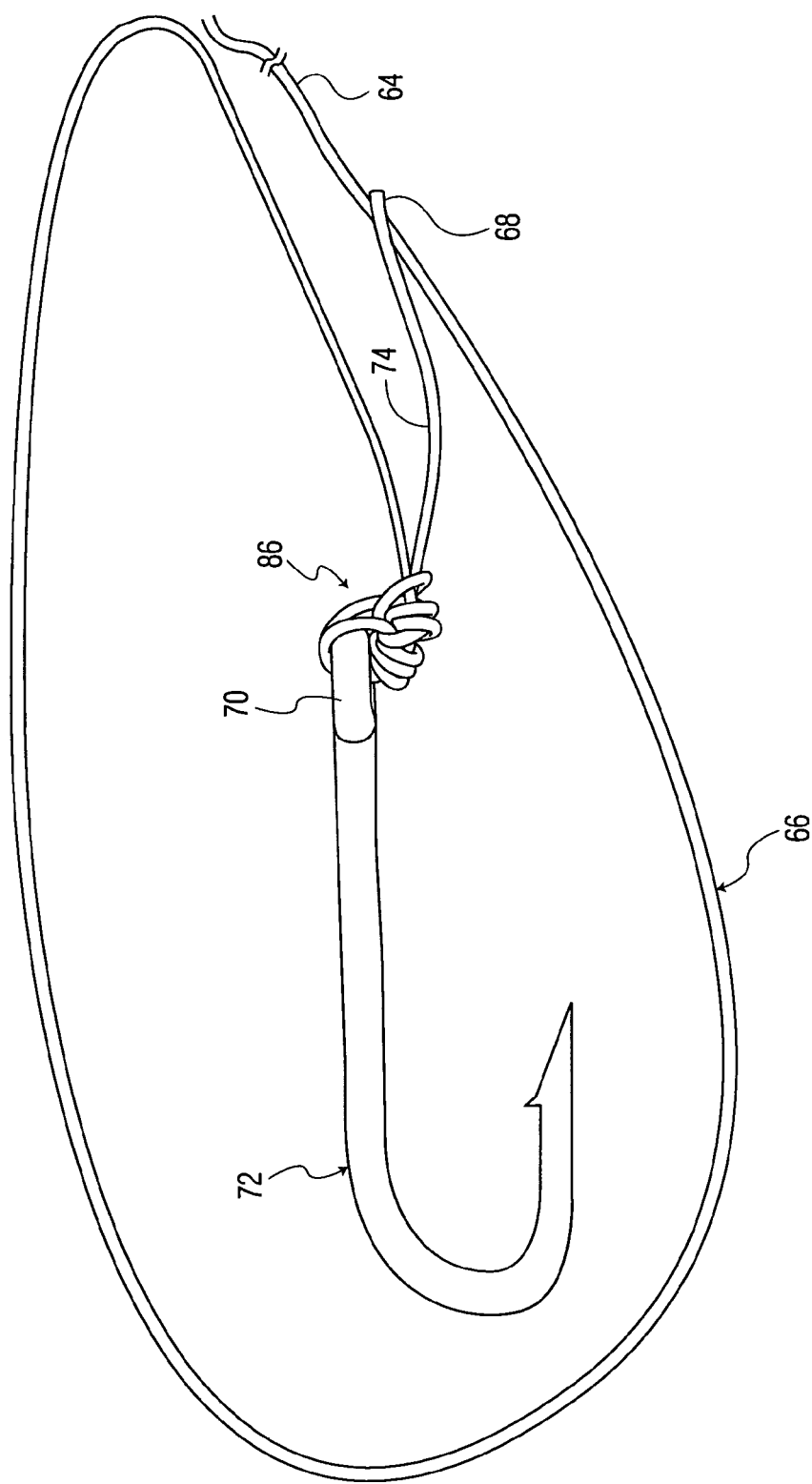

Referring to FIGS. 14 and 15, the user grasps the fish hook 72 and proceeds to remove the looped segment 76 and the looped portion 78 from the loop retaining portion 22 of the second post 20 and the catch 34 of the guide rod 28. The rotatably-actuated clamp assembly 42 is disengaged to release the standing end 64 of the line 66 to yield a preformed knot 86 comprising the looped segment 76 and looped portion 78 as shown in FIG. 15. Referring to FIG. 16, the working end 68 and standing end 64 of the line 66 are pulled away from the fish hook 72 to tighten the corresponding looped segment 76 and looped portion 78 into and complete the resulting knot 86.

The foregoing discussion discloses and describes merely exemplary embodiments of the present invention. One skilled in the art will readily recognize from such discussion, and from the accompanying claims, that various changes, modifications, and variations can be made therein without departing from the spirit and scope of the invention as defined in the following claims.

What is claimed is:

1. A knot tying tool for tying knots in cords or lines of material including those for attaching the line to an eyelet of an object, said knot tying tool comprising:
   a base member having first and second ends;
   a first post extending from the first end of the base member;
   a second post extending from the second end of the base member;
   loop retaining means operatively associated with the second post for retaining at least one loop of a line forming part of a knot being tied, wherein the line includes a working end and a standing end;
   a support member operatively associated with the first post, said support member including a catch positioned spaced apart from the loop retaining means for holding a portion of the retained at least one loop of the line; and
   at least one groove extending longitudinally along the distal end of the second post in operative association with said loop retaining means, said at least one groove being adapted for facilitating the passing of the working end of the line through the inside portion of the retained at least one loop.

2. The knot tying tool of claim 1, wherein:
   said support member comprises a guide rod extending from the first post toward the second post; and
   said catch comprises a projection extending radially from the distal end of the guide rod.

3. The knot tying tool of claim 2, wherein said guide rod includes a proximal end, and is adapted for slidable operation through the first post between an extended position and a retracted position relative to said second post.

4. The knot tying tool of claim 3, wherein the guide rod comprises a slot at the proximal end thereof for receiving and retaining a portion of the working end of the line therein.

5. The knot tying tool of claim 4, wherein:
   said guide rod comprises an alignment pin located near the proximal end thereof; and
   said first post comprises a corresponding recess for receiving the alignment pin of the guide rod to prevent rotation of the guide rod when the guide rod is in the extended position.

6. The knot tying tool of claim 1, wherein the loop retaining means comprises at least one notch oriented parallel to said base member and extending along at least a portion of the periphery of the second post, and configured for retaining the at least one loop of the line therearound.

7. The knot tying tool of claim 1, further comprising a rotatably-actuated clamp assembly located proximate the first end of the base member, being adapted for receiving and releasably retaining the standing end of the line.

8. The knot tying tool of claim 7, wherein the rotatably-actuated clamp assembly comprises:
   a rotatable eccentric stud; and
   a pin operatively associated with the eccentric stud.

9. A knot tying tool for tying knots in cords or lines of material including those for attaching the line to an eyelet of an object, said knot tying tool comprising:
   a base member having first and second ends;
   a first post extending from the first end of the base member;

a second post extending from the second end of the base member;

loop retaining means operatively associated with the second post for retaining at least one loop of a line forming part of a knot being tied, wherein the line includes a working end and a standing end;

a support member operatively associated with the first post, said support member including a catch positioned spaced apart from the loop retaining means for holding a portion of the retained at least one loop of the line;

a rotatably actuated clamp assembly located at the first end of the base member, said rotatably-actuated clamp assembly being adapted for receiving and releasably retaining the standing end of the line; and at least one groove extending longitudinally along the distal end of the second post in operative association with said loop retaining means, said at least one groove being adapted for facilitating the passing of the working end of the line through the inside portion of the retained at least one loop.

10. The knot tying tool of claim 9, wherein:
said support member comprises a guide rod extending from the first post toward the second post; and
said catch comprises a projection extending radially from the distal end of the guide rod.

11. The knot tying tool of claim 10, wherein said guide rod includes a proximal end, and is adapted for slidable operation through the first post between an extended position and a retracted position relative to the second post.

12. The knot tying tool of claim 11, wherein the guide rod comprises a slot at the proximal end thereof for receiving and retaining a portion of the working end of the line therein.

13. The knot tying tool of claim 12, wherein:
said guide rod comprises an alignment pin located near the proximal end thereof; and
said first post comprises a corresponding recess for receiving the alignment pin of the guide rod to prevent rotation of the guide rod when the guide rod is in the extended position.

14. The knot tying tool of claim 9, wherein the loop retaining means comprises at least one notch extending along at least a portion of the periphery of the second post, and configured for retaining the at least one loop of the line therearound.

15. The knot tying tool of claim 9, wherein the rotatably-actuated clamp assembly comprises:
a rotatable eccentric stud; and
a pin affixed proximate to the first end of the base member in operatively association with the eccentric stud.

16. A knot tying tool for tying knots in cords or lines of material including those for attaching the line to an eyelet of an object, said knot tying tool comprising:
a base member having first and second ends;
a first post extending from the first end of the base member;
a second post extending from the second end of the base member;
at least one notch extending along at least a portion of the periphery of the second post, and configured for at least one loop of a line forming part of the knot, wherein the line includes a working end and a standing end;
a guide rod including proximal and distal ends, said guide rod being adapted for slidable operation through the first post between an extended position and a retracted position;
said guide rod comprising a projection extending radially from the distal end thereof and positioned spaced apart from the loop retaining means for holding a portion of the retained at least one loop, and a slot at the proximal end thereof for receiving and retaining a portion of the line therein, and an alignment pin located near the proximal end thereof;

said first post comprising a corresponding recess for receiving the alignment pin of the guide rod to prevent rotation of the guide rod when the guide rod is in the extended position;

a rotatably-actuated clamp assembly located proximate the first end of the base member, comprising a rotatable eccentric stud, and a pin operatively associated with the eccentric stud for receiving and releasably retaining the standing end of the line therebetween; and at least one groove extending longitudinally along the distal end of the second post proximate the at least one notch, said at least one groove being adapted for facilitating the passing of the working end of the line through the inside portion of the retained at least one loop.

17. A method for tying knots in cords or lines of material including those for attaching the line to an eyelet of an object, comprising the steps of:

a) forming a knot tying tool comprising:
a base member having first and second ends;
a first post extending from the first end of the base member;
a second post extending from the second end of the base member;
loop retaining means operatively associated with the second post for retaining at least one loop of a line forming part of a knot being tied, wherein the line includes a working end and a standing end;
a support member operatively associated with the first post, said support member including a catch positioned spaced apart from the loop retaining means for holding a portion of the retained at least one loop of the line;
a rotatably-actuated clamp assembly located proximate to the first end of the base member, being adapted for receiving and releasably retaining the standing end of the line; and
at least one groove extending longitudinally along the distal end of the second post proximate the at least one notch, said at least one groove being adapted for facilitating the passing of the working end of the line through the inside portion of the retained at least one loop;

b) obtaining a predetermined length of a line having a working end and a standing end;

c) securing a portion of the standing end of the line in the rotatably-actuated clamp assembly;

d) passing the working end of the line through an eyelet of an object to be attached;

e) looping at least one loop from a portion of the working end of the line around the loop retaining means and the catch of the support member to form a looped segment;

f) directing further portions of the working end of the line around the loop retaining means and the catch of the supporting member, into one of the at least one groove through the inside portion of the retained looped segment, through the portion of the at least one loop between the catch and the loop retaining means, or combinations thereof;

g) removing the looped segment from the loop retaining means and the catch of the supporting member; and h) pulling the working end and standing end to tighten the looped segment into the resulting knot.

* * * * *